United States Patent [19]

Yamazaki et al.

[11] Patent Number: 4,782,707
[45] Date of Patent: Nov. 8, 1988

[54] APPARATUS FOR DETECTING FLOW AMOUNT OF FLUID IN PASSAGE

[75] Inventors: Shigeru Yamazaki, Kyoto; Hiroyuki Matsui, Osaka; Yoshitaka Morikawa, Yamatokoriyama; Hideaki Konishi, Osaka, all of Japan

[73] Assignee: Matsushita Electric Industrial Co., Ltd., Osaka, Japan

[21] Appl. No.: 115,316

[22] Filed: Nov. 2, 1987

[30] Foreign Application Priority Data

Nov. 5, 1986 [JP] Japan .................................. 61-263409
Jan. 28, 1987 [JP] Japan .................................. 62-17701

[51] Int. Cl.$^4$ .............................................. G01F 1/05
[52] U.S. Cl. ................................ 73/861.05; 73/861.32
[58] Field of Search .................. 73/861.05, 861.32, 255

[56] References Cited

U.S. PATENT DOCUMENTS 3,443,432  5/1969  Shonin et al. ................... 73/861.32
4,658,654  4/1987  Ozaku et al. .................... 73/861.05

FOREIGN PATENT DOCUMENTS 2318715  10/1974  Fed. Rep. of Germany ... 73/861.05
2910387   9/1980  Fed. Rep. of Germany ........ 73/255
0771466  10/1980  U.S.S.R. ........................... 73/861.05
1029093   5/1966  United Kingdom ................... 73/255

Primary Examiner—Herbert Goldstein
Attorney, Agent, or Firm—Pollock, VandeSande & Priddy

[57] ABSTRACT

An apparatus for detecting the flow amount of a fluid passing through a passage. The apparatus comprises a scroll chamber having a circular horizontal cross section and having an inlet opening defined in a tangential direction of the scroll chamber and an outlet opening defined at a substantial center portion of a bottom surface of the scroll chamber. The fluid is introduced through the inlet opening and discharged from the outlet opening. In the scroll chamber, a conically protruding member is provided on a substantial center portion of the top surface of the scroll chamber so as to be protruded vertically and downwardly along the axis of the scroll chamber. A spheral member encased in the scroll chamber is turned about the protruding member and along a wall of the scroll chamber in response to introduction of the fluid through the inlet opening. The flow amount of fluid is measured by detecting the number of turns of the spheral member. The scroll chamber has a conical portion whose diameter decreases toward the upper side and is arranged so that the spheral member is turned with it being brought into contact with the tapered surface of the conical portion. This provides an extremely stable detection of the fluid flow.

5 Claims, 2 Drawing Sheets

APPARATUS FOR DETECTING FLOW AMOUNT OF FLUID IN PASSAGE

BACKGROUND OF THE INVENTION

The present invention relates generally to flow meters for measuring the flow amount of a fluid passing through a passage.

Various devices and systems have been devised theretofore to measure the flow amount of a fluid passing through a passage. One known arrangement is that an impeller is provided to be rotatable about the axis of a fluid flow and the flow amount measurement is made by detection of the turning number of a ball made of a magnetic material and provided in operative relation to the impeller. Although satisfactory for measuring flow with relatively large amount (over about 3 l/min.), such an arrangement is disadvantageous in accuracy of detection of flow with a relatively small amount (about 0.3 to 2 l/min.) and in size-reduction of the apparatus and further in that the detection of the turning number is unstable because of deflection of the ball in the directions of the axis of the fluid flow. These disadvantages result in difficulty being encountered to employ it for systems necessary to stably measure flow with a relatively small amount and for small-sized apparatus such as a sanitary cleaner to be inserted into a human body.

SUMMARY OF THE INVENTION

The present invention has been developed in order to remove the disadvantages inherent to the prior flow measuring apparatus.

It is therefore an object of the present invention to provide a new and improved flow measuring apparatus which is capable of stably and accurately measuring the fluid flow irrespective of relatively small flow amount and allowing the size-reduction.

In a feature of the present invention, the flow measuring apparatus has a scroll chamber having a circular horizontal cross section and having an inlet opening defined in a tangential direction thereof and an outlet opening defined at a substantial center portion of a bottom surface thereof so that a fluid is introduced through the inlet opening and discharged from the outlet opening. On the substantial center portion of the top surface of the scroll chamber is provided a conically protruding member which is protruded vertically and downwardly along the axis of the scroll chamber. The conically protruding member forms a volute channel together with the walls of the scroll chamber and the introduced fluid is turned along the formed channel. A spheral member is encased in the channel so as to be turned about the protruding member and along a wall of the scroll chamber in response to introduction of the fluid through the inlet opening. The number of turns of the spheral member is detected by a detection circuit to measure a flow amount of the fluid. Preferably, the scroll chamber comprises a cylindrical portion whose diameter is constant and a conical portion whose diameter is decreased toward the upper side, and the height of the cylindrical portion of the scroll chamber is determined so that the spheral member is turned with it being brought into contact with the side surface of the conical portion. This results in stable turning of the spheral member along the channel and hence in stable detection of the fluid flow.

BRIEF DESCRIPTION OF THE DRAWINGS

The present invention will be described in further detail with reference to the accompanying drawings, in which.

DETAILED DESCRIPTION OF THE INVENTION

Figure 1:
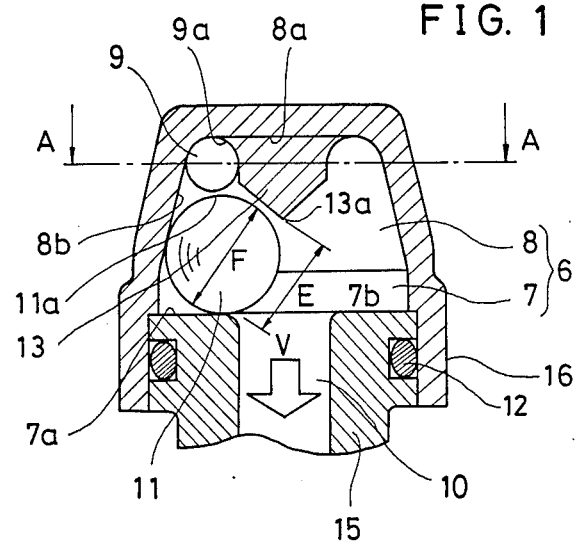
FIG. 1 is a vertical cross-sectional view showing an arrangement of a flow measuring apparatus according to the present invention.
Figure 2:
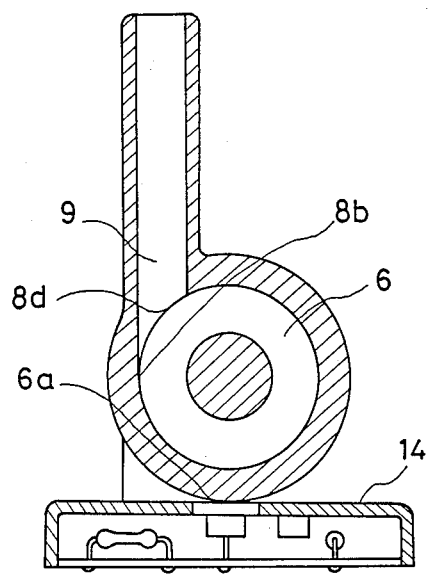
FIG. 2 is a cross-sectional view taken along a line A—A of FIG. 1.
Figure 3:
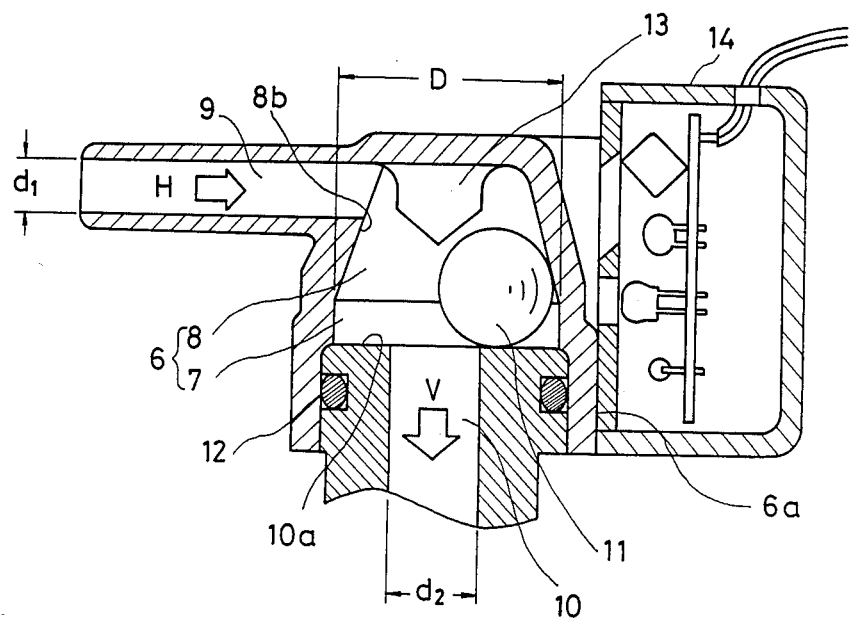
FIG. 3 is a side cross-sectional view the flow measuring apparatus according to the embodiment.

Referring now to FIGS. 1 to 3 which show an arrangement of a flow measuring apparatus according to an embodiment of the present invention, FIG. 1 being a vertical cross-sectional view of the flow measuring apparatus, FIG. 2 being a cross-sectional view taken along a line A—A of FIG. 1, and FIG. 3 being a side cross-sectional view of the flow measuring apparatus. In FIGS. 1 to 3, illustrated at reference numeral 6 is a scroll chamber comprising a cylindrically shaped portion 7 and a conically shaped portion 8 which are coaxially coupled to each other. The scroll chamber 6 has an inlet opening 8d which is coupled to a fluid introduction passage 9 so that a fluid is introduced thereinto along a direction indicated by an arrow H which is a tangential direction of the conically shaped portion 8. The inner surface 9a of the fluid introduction passage 9 is connected to the top surface 8a of the scroll chamber 6 and the tapered surface 8b of the conically shaped portion 8 so as not to provide influence to the configuration of the scroll chamber. The scroll chamber 6 further has an outlet opening 7b, which is defined in the bottom surface 7a of the scroll chamber 6 and the center of which is substantially coincident with the center of the bottom surface 7a. The outlet opening 7b is coupled to a fluid discharge passage 10, which is defined in a direction normal to the bottom surface 7a, so that the fluid introduced into the scroll chamber 6 is discharged therefrom in a direction indicated by an arrow V. In the actual structure, an elongated cylindrical member 15 is inserted into a ring-shaped sleeve 16 connected to the wall of the scroll chamber 6 so that the top surface of the elongated cylindrical member 15 acts as the bottom surface 7a of the scroll chamber 6 and the hollow portion thereof acts as the fluid discharge passage 10. Numeral 12 is an O-ring for sealing between the elongated cylindrical member 15 and the ring-shaped sleeve 16.

In the scroll chamber 6, a conically shaped protruding member 13 is provided so that it is protruded from the top surface 8a thereof, the axis of the conically shaped protruding member 13 being coincident with the axis of the scroll chamber 6. A ball, or spheral member, 11 made of a magnetic material and having a mirror-finished surface is encased between the tapered surface of the conically shaped protruding member 13 and the bottom surface 7a of the scroll chamber so that the ball 11 is movable along a channel formed by the tapered surface thereof and the bottom surface 7a and side surface of the scroll chamber 6. Here, as seen from FIG. 1, the distance E between the tip portion 13a of the protruding member 13 and the periphery of the outlet opening 7b is longer than the diameter F of the ball 11 so as to cause the ball 11 to turn therealong without being engaged with the fluid discharge passage 10. The inlet opening 8d of the scroll chambers 6 is positioned above the ball 11 and the protruding member 13 also acts for promotion of the volute action of the fluid introduced through the fluid introduction passage 9. Thus, the ball 11 is turned along the channel in response to the volute flow of the fluid with it being brought into contact with the tapered surface 8b of the conically shaped portion 8 and the bottom surface 7a of the scroll chamber 6.

On the outer wall 6a of the scroll chamber 6 is provided a detection circuit unit 14 for detecting the number of turns of the ball 11 and for generating an electrical pulse signal corresponding to the detected number of turns. Such a detection circuit unit is disclosed in many documents, for example, Japanese Patent Provisional Publication No. 59-153123, and therefore the description thereof will be omitted for brevity.

In operation, a fluid introduced into the scroll chamber 6 through the fluid introduction passage 9 provided in the tangential direction of the conically shaped portion 8 flows along the inner wall of the scroll chamber 6 so as to form a volute flow and is discharged from the fluid discharge passage 10 defined at the center portion of the bottom surface 7a of the scroll chamber 6. At this time, the ball 11 encased therein is rotated about the protruding member 13 at a speed substantially proportional to the volute flow speed of the introduced fluid, and rotation thereof is made with the ball 11 being brought into contact with the tapered surface 8b of the conically shaped portion 8 and the bottom surface 7a of the scroll chamber 6 (or the periphery of the outlet opening 7b). The centrifugal force and downward force of the ball 11 increase in proportion to the rotating speed thereof, the downward force thereof being generated due to the tapered surface 8a of the conically shaped portion 8. Thus, the turning of the ball 11 becomes stable without vibration, resulting in stable flow detection. Furthermore, generally, the flow of the introduced fluid is not necessarily constant, often taking various flow states such as pulsating flow. In this embodiment, in order to cope with this problem, the inlet opening 8d coupled to the fluid introduction passage 9 is positioned at an upper side as compared with the position of the uppermost portion 11a of the ball 11 as clearly illustrated in FIG. 1. That is, the fluid introduced therein does not directly hit the ball 11 and therefore the rotation of the ball 11 is not affected by the slight flow variation generally occurrring, similarly resulting in stable flow detection. In addition, according to this embodiment, since the ball-turning channel is formed only by making smaller the distance E between the tip portion 13a of the protruding member 13 and the periphery of the output opening 7b as compared with the diameter F of the ball 11, the fluid flow is not substantially blocked by anything. This provides a characteristic of low pressure loss.

Figure 4:
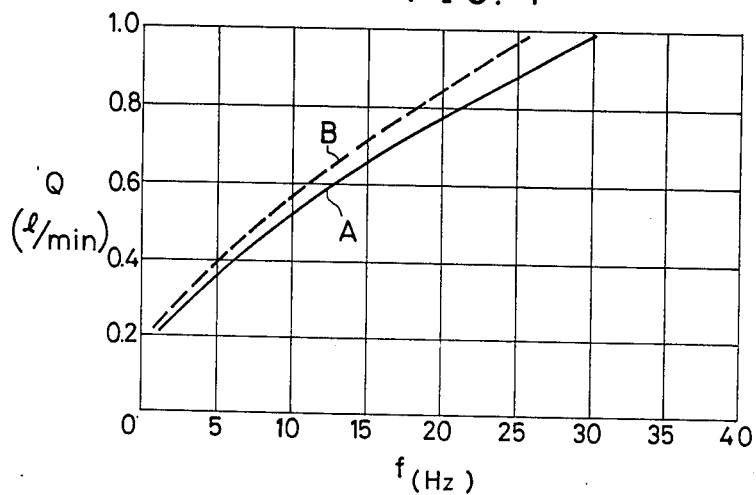
FIG. 4 is a graphic illustration for describing the charateristic of the flow measuring apparatus according to the embodiment.

FIG. 4 is a graphic diagram showing flow characteristics of the flow detecting apparatus according to the embodiment, wherein the vertical axis represents the flow amount Q (l/min) of water passing through the scroll chamber 6 and the horizontal axis represents the number f (Hz) of turns of the ball 11. The characteristic curves can be varied in accordance with the application field of the flow detecting apparatus. For example, with making smaller the inner diameter d1 of the fluid introduction passage 9, the flow speed of the fluid is increased and the number of turns of the ball 11 is increased and thus the characteristic is changed from A to B. Furthermore, the characteristic is varied in accordance with the change of the inner diameter of the scroll chamber 6 or the inner diameter d2 of the fluid dischage passage 10, allowing the use for various applications.

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention.

What is claimed is:

1. An apparatus for detecting a flow amount of a fluid, comprising:
    a body;
    a scroll chamber defined in said body, said scroll chamber having a circular horizontal cross section and having an inlet opening defined in a tangential direction of said scroll chamber and an outlet opening defined at a substantially center portion of a bottom surface of said scroll chamber, the bottom surface located downstream of the inlet opening, said fluid being introduced through said inlet opening and discharged from said outlet opening, said scroll chamber having a conical portion whose diameter is decreased toward an end of the chamber having the inlet opening and said inlet opening being defined in the tangential direction of said conical portion;
    a protruding member provided on a substantially center portion of a top surface of said scroll chamber so as to be partially protruding downstream along the axis of said scroll chamber but positioned at a distance removed from the outlet opening;
    a spheral member encased in said scroll chamber so as to turn about said protruding member and along a wall of said scroll chamber in response to introduction of said fluid through said inlet opening, said turning spheral member being brought into contact with the wall surface of said conical portion wherein an axial component of force on the spheral member due to the introduced fluid maintains the spheral member in stable motion along the bottom chamber surface and out of registry with the inlet opening; and
    a detecting unit for detecting the number of turns of said spheral member to measure a flow amount of said fluid.

2. An apparatus as claimed in claim 1, wherein said scroll chamber comprises a cylindrical portion located downstream from said conical portion, the height of which is less than the radius of said spheral member.

3. An apparatus as claimed in claim 1, wherein said protruding member has a conical configuration in which the diameter decreases in accordance with protrusion.

4. An apparatus as claimed in claim 3, wherein the distance between a tip of said protruding member and the periphery of said outlet opening is smaller than the diameter of said spheral member.

5. An apparatus as claimed in claim 1, wherein said inlet opening is defined to be positioned above said spheral member.

* * * * *